United States Patent
Eda

(10) Patent No.: US 12,475,924 B2
(45) Date of Patent: *Nov. 18, 2025

(54) SUBSTRATE FOR MAGNETIC DISK AND MAGNETIC DISK

(71) Applicant: HOYA CORPORATION, Tokyo (JP)

(72) Inventor: Shinji Eda, Hung Yen Province (VN)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,368

(22) Filed: May 15, 2024

(65) Prior Publication Data

US 2024/0296867 A1    Sep. 5, 2024

Related U.S. Application Data

(63) Continuation of application No. 18/194,619, filed on Apr. 1, 2023, now Pat. No. 12,020,735, which is a continuation of application No. 17/266,079, filed as application No. PCT/JP2019/031269 on Aug. 7, 2019, now Pat. No. 11,640,833.

(30) Foreign Application Priority Data

Aug. 7, 2018 (JP) .................................. 2018-148923
Jan. 24, 2019 (JP) .................................. 2019-009901

(51) Int. Cl.
G11B 5/73    (2006.01)

(52) U.S. Cl.
CPC ...... *G11B 5/73921* (2019.05); *G11B 5/73911* (2019.05); *G11B 5/73917* (2019.05); *G11B 5/73919* (2019.05)

(58) Field of Classification Search
None
See application file for complete search history.

(56) References Cited

U.S. PATENT DOCUMENTS

| | | | |
|---|---|---|---|
| 5,252,367 A | 10/1993 | Sato et al. | |
| 5,997,977 A | 12/1999 | Zou et al. | |
| 6,294,490 B1 | 9/2001 | Zou et al. | |
| 7,622,206 B2 | 11/2009 | Aida et al. | |

(Continued)

FOREIGN PATENT DOCUMENTS

| JP | H10105960 A | 4/1998 |
|---|---|---|
| JP | 2001-180975 A | 7/2001 |

(Continued)

OTHER PUBLICATIONS

International Search Report in PCT/JP2019/031269 dated Oct. 8, 2019.

(Continued)

*Primary Examiner* — Kevin M Bernatz
(74) *Attorney, Agent, or Firm* — Global IP Counselors, LLP

(57) ABSTRACT

A substrate for a magnetic disk has a disk shape. The substrate has a diameter D of 85 mm or more and 100 mm or less, and a thickness T of 0.3 mm or more and 0.5 mm or less. Regarding a Young's modulus E and the thickness T of the substrate, a value of $E \cdot T^3$ is 3 to 18 $(GPa \cdot mm^3)$. A material of the substrate has a Q-value of 1500 or less under conditions of 3000 Hz and room temperature.

18 Claims, 2 Drawing Sheets

(56) References Cited

U.S. PATENT DOCUMENTS

| | | | |
|---|---|---|---|
| 7,687,419 B2 | 3/2010 | Kawai | |
| 10,573,342 B2 | 2/2020 | Murase et al. | |
| 10,593,359 B2 | 3/2020 | Murase et al. | |
| 11,031,036 B2 | 6/2021 | Osakabe | |
| 11,152,026 B2 | 10/2021 | Osakabe | |
| 11,545,178 B2 | 1/2023 | Osakabe | |
| 11,640,833 B2 | 5/2023 | Eda | |
| 11,694,718 B2 | 7/2023 | Osakabe | |
| 12,020,735 B2 * | 6/2024 | Eda | B24B 1/00 |
| 2003/0109370 A1 | 6/2003 | Ikenishi et al. | |
| 2003/0134734 A1 | 7/2003 | Nishimoto et al. | |
| 2004/0018929 A1 | 1/2004 | Suu | |
| 2006/0040142 A1 | 2/2006 | Zou et al. | |
| 2006/0216552 A1 | 9/2006 | Ikenishi et al. | |
| 2008/0020238 A1 | 1/2008 | Tanaka et al. | |
| 2008/0130171 A1 | 6/2008 | Behan et al. | |
| 2010/0087307 A1 | 4/2010 | Murata et al. | |
| 2010/0247977 A1 | 9/2010 | Tsuchiya et al. | |
| 2012/0141668 A1 | 6/2012 | Nakashima | |
| 2013/0122265 A1 | 5/2013 | Miyamoto et al. | |
| 2013/0288575 A1 | 10/2013 | Endo et al. | |
| 2014/0036644 A1 * | 2/2014 | Matsumoto | C03C 21/002 |
| | | | 428/846.9 |
| 2015/0248910 A1 | 9/2015 | Itaya et al. | |
| 2015/0262604 A1 | 9/2015 | Takahashi et al. | |
| 2015/0329418 A1 | 11/2015 | Murata et al. | |
| 2016/0225396 A1 | 8/2016 | Shimojima | |
| 2018/0005659 A1 | 1/2018 | Itaya et al. | |
| 2018/0226095 A1 | 8/2018 | Murase et al. | |
| 2019/0062878 A1 | 2/2019 | Murase et al. | |
| 2019/0066724 A1 | 2/2019 | Nakamura et al. | |
| 2019/0228798 A1 | 7/2019 | Hashimoto et al. | |
| 2019/0333535 A1 | 10/2019 | Takimoto et al. | |
| 2019/0390304 A1 | 12/2019 | Murata et al. | |
| 2020/0035268 A1 | 1/2020 | Osakabe | |
| 2020/0211595 A1 | 7/2020 | Yukimatsu et al. | |
| 2020/0365180 A1 | 11/2020 | Kitawaki et al. | |
| 2020/0377984 A1 | 12/2020 | Kitawaki et al. | |
| 2021/0062044 A1 | 3/2021 | Ando | |
| 2021/0065742 A1 | 3/2021 | Kitawaki et al. | |
| 2021/0151077 A1 | 5/2021 | Kitawaki et al. | |
| 2021/0179480 A1 | 6/2021 | Mao et al. | |
| 2021/0201946 A1 | 7/2021 | Kitawaki et al. | |
| 2022/0059126 A1 | 2/2022 | Okada | |
| 2023/0121742 A1 | 4/2023 | Osakabe | |
| 2023/0298623 A1 | 9/2023 | Osakabe | |

FOREIGN PATENT DOCUMENTS

| | | |
|---|---|---|
| JP | 2005-302289 A | 10/2005 |
| JP | 2007197235 A | 8/2007 |
| JP | 2008-97821 A | 4/2008 |
| JP | 2015069670 A | 4/2015 |
| JP | 2019128966 A | 8/2019 |
| WO | 2012160897 A1 | 11/2012 |
| WO | 2014051153 A1 | 4/2014 |
| WO | 2017119147 A1 | 7/2017 |
| WO | 2017204143 A1 | 11/2017 |

OTHER PUBLICATIONS

"Modeling the Constitutive Relationship of Al—0.62Mg—0.73Si Alloy Based on Artificial Neural Network", MDPI, Han etal, Mar. 2017.

* cited by examiner

SUBSTRATE FOR MAGNETIC DISK AND MAGNETIC DISK

CROSS-REFERENCE TO RELATED APPLICATIONS

This is a continuation application of U.S. patent application Ser. No. 18/194,619, filed on Apr. 1, 2023, now U.S. Pat. No. 12,020,735, which is a continuation application of U.S. patent application Ser. No. 17/266,079, filed on Feb. 4, 2021, now U.S. Pat. No. 11,640,833, which is a U.S. National stage application of International Patent Application No. PCT/JP2019/031269, filed on Aug. 7, 2019, which, in turn, claims priority to Japanese Patent Application No. 2018-148923, filed in Japan on Aug. 7, 2018 and Japanese Patent Application No. 2019-009901, filed in Japan on Jan. 24, 2019. The entire contents of U.S. patent application Ser. Nos. 17/266,079 and 18/194,619, International Patent Application No. PCT/JP2019/031269, and Japanese Patent Application Nos. 2018-148923 and 2019-009901 are hereby incorporated herein by reference.

BACKGROUND

Field of the Invention

The present invention relates to a substrate for a magnetic disk, and a magnetic disk.

Background Information

Conventionally, glass substrates and aluminum alloy substrates have been used as substrates for a magnetic disk. Magnetic disks are formed by forming a magnetic film on main surfaces of these substrates. There is a demand for magnetic disks that have few surface defects and in which reading and writing of information is not hindered, and reading and writing of a large amount of information is enabled. Moreover, the density of magnetic recording has been increased to meet the demand for an increase in the storage capacity of hard disk drive apparatuses (referred to as "HDDs" hereinafter).

For example, a method for manufacturing a glass substrate for a magnetic disk is known in which the surface roughness (arithmetic average roughness Ra) of a glass substrate for a magnetic disk is reduced such that reading and writing using a magnetic head (DFH head) equipped with a DFH (Dynamic Flying Height) mechanism can be performed without hindrance in a case where the density of magnetic recording is increased (WO 2014/051153).

SUMMARY

Recently, in the hard disk drive industry, the miniaturization of magnetic particles in magnetic disks is approaching the limit, and the speed at which recording density was improved in the past has been showing signs of slowing down. On the other hand, in order to analyze big data, for example, there is increasing demand for an increase in the storage capacity of HDDs. Thus, attempts have been made to increase the number of magnetic disks provided in one HDD. In general, nominal 3.5-inch type HDDs are used to store a large amount of data as mentioned above.

If an increase in the storage capacity is to be realized by increasing the number of magnetic disks incorporated in an HDD, there is a need to reduce the thickness of a substrate for a magnetic disk occupying the majority of the thickness of the magnetic disk because space in the HDD is limited. Furthermore, there is also a demand for an increase in the size of a magnetic disk in order to increase the storage capacity thereof.

Here, it has been found that, if the diameter of a substrate for a magnetic disk is increased and the thickness thereof is reduced, the rigidity of the substrate decreases, large vibration is likely to occur, and vibration is unlikely to settle in some cases. For example, an incredibly large number of HDDs are used in a data center for a cloud, and thus HDDs are often replaced due to failures. It was revealed that a new HDD fails due to an impact occurring when the new HDD is mounted on a rack, or the period of time until it fails is shortened. As a result of more thorough studies, it was found that, when an HDD takes on an external impact, the HDD is damaged even though the magnetic disk is not rotating due to no power being supplied to the HDD.

Unlike steady-state flutter vibration caused by the rotating magnetic disk and the air flow around the magnetic disk in a steady rotational state, vibration caused by an external impact in this manner attenuates over time. However, if this vibration has a large amplitude, a magnetic disk is likely to come into contact with a ramp inside the HDD and a magnetic disk adjacent thereto. Furthermore, the topmost magnetic disk among a plurality of magnetic disks that are arranged at regular intervals may come into contact with the top face of a magnetic-disk container of the HDD. Due to such contact, the contact portion of the magnetic disk may become chipped, resulting in the formation of particles. Particles may also be formed due to rubbing or scraping. The formed particles scatter in the container and often adhere to the read/write region (main surface) of the magnetic disk with a large area.

As described above, in the case where the diameter of a substrate for a magnetic disk is increased and the thickness thereof is reduced, vibration caused by an external impact, which has not conventionally been an issue, and particles formed due to this vibration cannot be ignored. In particular, in the case of a large substrate for a magnetic disk with a nominal diameter of 3.5 inches (e.g., a diameter of 95 mm) or more, particles formed due to the above-mentioned contact caused by the vibration of the substrate cannot be ignored.

In view of this, it is an object of the present invention to provide a substrate for a magnetic disk, and a magnetic disk that are configured such that the formation of particles caused by an external impact can be suppressed even if the diameter of the substrate for a magnetic disk is increased and the thickness thereof is reduced.

An aspect of the present invention is a substrate for a magnetic disk having a disk shape. The substrate has a diameter D of 85 mm or more and 100 mm or less, and a thickness T of 0.3 mm or more and 0.5 mm or less. Regarding a Young's modulus E and the thickness T of the substrate, a value of $E \cdot T^3$ is 3 to 18 (GPa·mm$^3$). A material of the substrate has a Q-value of 1500 or less under conditions of 3000 Hz and room temperature.

It is preferable that the substrate is a glass substrate made of glass with a glass transition point of 650° C. or higher.

It is preferable that the substrate is a non-magnetic metal substrate, and the non-magnetic metal substrate is an aluminum alloy substrate that has a surface with which an alloy film including Ni and P is provided.

It is preferable that a chamfered face is formed on at least an outer circumferential end face of the substrate, and a width $W_1$ of the chamfered face in a radial direction of the substrate is 20 μm or more and 90 μm or less.

Another aspect of the present invention is a magnetic disk, and a surface of the substrate for a magnetic disk mentioned above is provided with at least a magnetic film.

Another aspect of the present invention is a substrate for a magnetic disk having a disk shape. The substrate has a diameter D of 85 mm or more and 100 mm or less, and a thickness T of 0.3 mm or more and 0.5 mm or less, regarding a Young's modulus E and the thickness T of the substrate, a value of $E \cdot T^3$ is 3 to 18 (GPa·mm³), and a material of the substrate has a $\rho \cdot (1-v)^2 \cdot Q/E$ value of less than 25 (g/cm³/GPa), where $\rho$ represents a density (g/cm³) of the material at room temperature, Q represents a Q-value of the material under conditions of 3000 Hz and room temperature, E represents a Young's modulus (GPa) of the material at room temperature, and $v$ represents a Poisson's ratio of the material at room temperature.

It is preferable that the substrate is a glass substrate made of glass with a glass transition point of 650° C. or higher.

It is preferable that the substrate is a non-magnetic metal substrate, and the non-magnetic metal substrate is an aluminum alloy substrate that has a surface with which an alloy film including Ni and P is provided.

It is preferable that a chamfered face is formed on at least an outer circumferential end face of the substrate, and a width $W_1$ of the chamfered face in a radial direction of the substrate is 20 μm or more and 90 μm or less.

Yet another aspect of the present invention is a magnetic disk, and a surface of the substrate for a magnetic disk mentioned above is provided with at least a magnetic film.

With the above-described substrate for a magnetic disk, and the above-described magnetic disk, the formation of particles caused by an external impact can be suppressed even if the diameter of the substrate for a magnetic disk is increased and the thickness thereof is reduced.

DETAILED DESCRIPTION OF THE EMBODIMENTS

Hereinafter, a substrate for a magnetic disk of the present invention will be described in detail. It should be noted that, although the following is a description of a case where a glass substrate for a magnetic disk is used, a non-magnetic metal substrate may also be used as the substrate for a magnetic disk, in addition to a glass substrate.

Aluminosilicate glass, soda-lime glass, borosilicate glass, or the like can be used for the glass substrate. In particular, amorphous aluminosilicate glass can be favorably used because it can be chemically strengthened as needed and can be used to produce a magnetic-disk glass substrate that is excellent in flatness of main surfaces and substrate strength.

For example, an aluminum alloy, a titanium alloy, Si single crystal, or the like can be used as a material of a metal substrate.

A magnetic disk is produced by forming at least a magnetic film on the surface of this substrate for a magnetic disk.

Figure 1:
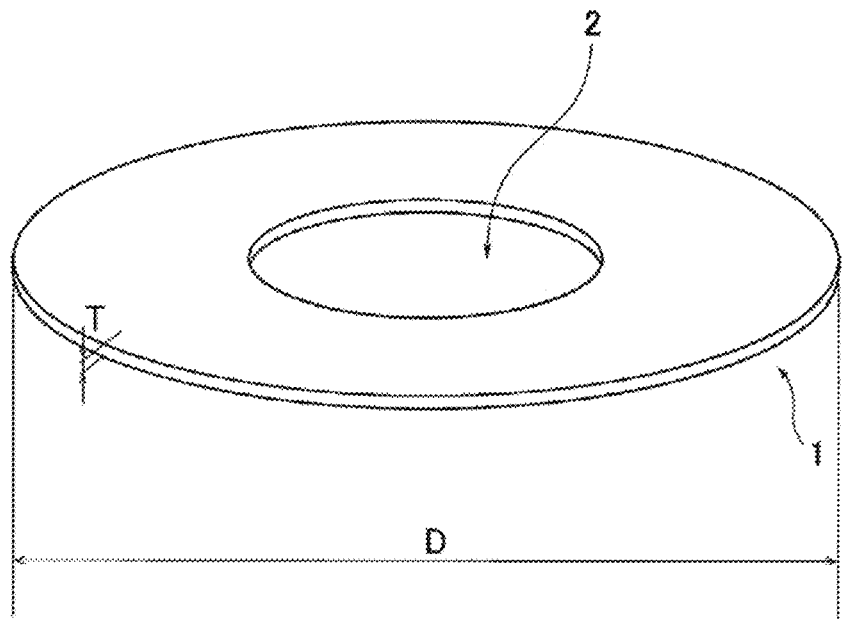
FIG. 1 is a diagram showing an example of the external shape of a substrate for a magnetic disk according to one embodiment.

FIG. 1 is a diagram showing the external shape of a substrate for a magnetic disk according to this embodiment. As shown in FIG. 1, a substrate 1 for a magnetic disk (referred to merely as a "substrate 1" hereinafter) according to this embodiment is a thin disk-shaped substrate provided with an inner hole 2. A magnetic disk is produced by forming films such as a magnetic film, a base film, a soft magnetic layer, and the like on this substrate 1.

Although there is no limitation on the size of the substrate 1 as long as it has a diameter D of 85 mm or more and preferably 90 mm or more, the substrate 1 can be favorably applied to a substrate for a magnetic disk with a nominal diameter of 3.5 inches, for example. In the case of a substrate for a magnetic disk with a nominal diameter of 3.5 inches, the disk shape has a diameter D (outer diameter) of 85 mm or more and preferably 90 mm or more. Specifically, the nominal value of the outer diameter of the disk shape is 95 mm or 97 mm.

As described above, in the case of vibration of a magnetic disk that is caused by an external impact and is different from flutter vibration, the amplitude increases and is less likely to attenuate as the outer diameter of the substrate 1 increases. Accordingly, the substrate 1 according to this embodiment is preferably used for a magnetic disk with a nominal standard size of 3.5 inches or more.

The substrate 1 according to this embodiment has a diameter D of 85 mm or more and preferably 90 mm or more, and has a thickness T of 0.6 mm or less. Furthermore, a material with a Young's modulus E of 90 GPa or more is used for the substrate 1. The substrate 1 has a shape with an increased diameter D and a reduced thickness T compared with that of a conventional substrate. Accordingly, the number of magnetic disks incorporated in an HDD can be increased, thus making it possible to increase the storage capacity. In this case, the substrate 1 has a large diameter D and a small thickness T, and therefore, as described above, a magnetic disk is likely to come into contact with a ramp inside an HDD and a magnetic disk adjacent thereto inside the HDD due to vibration of the substrate 1 caused by an impact occurring when the HDD is installed. Furthermore, the topmost magnetic disk among the magnetic disks may come into contact with the top face of a magnetic-disk container of the HDD.

It should be noted that the upper limit of the diameter D of the substrate 1 is 100 mm, for example, from the viewpoint of the standard size of a nominal 3.5-inch type HDD. The lower limit of the thickness T of the substrate 1 is 0.30 mm, for example, from the viewpoint of suppressing arcing when applying a bias voltage during a film formation process. Although there is no particular need to determine the upper limit of the Young's modulus E, it is 120 GPa, for example, from the viewpoint of processability.

Figure 2:
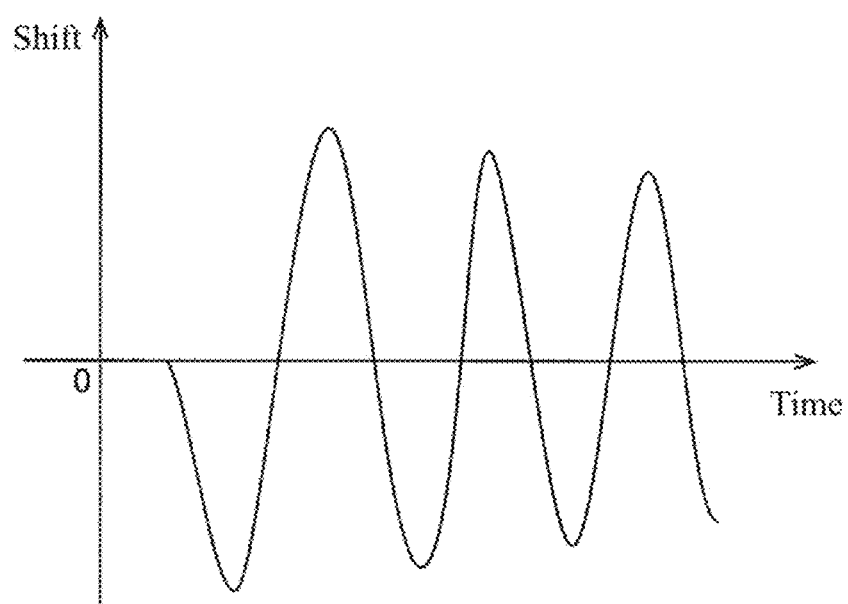
FIG. 2 is a diagram showing an example of vibration of a substrate for a magnetic disk according to one embodiment.

FIG. 2 is a diagram showing an example of vibration of the substrate 1 caused by the above-mentioned impact. This vibration is different from steady-state flutter vibration caused by a rotating magnetic disk and the air flow around the magnetic disk in a steady rotational state. Due to the vibration caused by an impact, the main surfaces of the substrate 1 are shifted in an out-of-plane direction of the main surfaces. In particular, in the HDD, the inner circumferential end portion is fixed to a spindle, but the outer circumferential end portion is a free end and is shifted in the out-of-plane direction. Due to such vibration that causes the shift in the out-of-plane direction of the main surfaces (vibration in a thickness direction), a magnetic disk comes into contact with a ramp inside the HDD, a magnetic disk adjacent thereto, and the top face of the magnetic-disk container. Due to such contact, the contact portion of the magnetic disk may be chipped, resulting in the formation of particles. The formed particles scatter in the container and often adhere to the read/write region of the magnetic disk. Accordingly, in this embodiment, a material with a Young's modulus of 90 GPa or more is used for the substrate 1.

In the case where a glass substrate is used as the substrate 1, amorphous oxide glass with a Young's modulus of 90 GPa or more can be obtained based on the following glass compositions, for example.

Glass 1

Glass 1 is configured such that
the content of $SiO_2$ is 56 to 80 mol %,
the content of $Li_2O$ is 1 to 10 mol %,
the content of $B_2O_3$ is 0 to 4 mol %, and
the total content of MgO and CaO (MgO+CaO) is 9 to 40 mol %.

The glass 1 has a specific gravity of 2.75 $g/cm^3$ or less, and has a glass transition temperature Tg of 650° C. or higher.

Glass 2

Glass 2 is configured such that
the content of $SiO_2$ is 56 to 80 mol %,
the content of $Li_2O$ is 1 to 10 mol %,
the content of $B_2O_3$ is 0 to 4 mol %,
the total content of MgO and CaO (MgO+CaO) is 9 to 40 mol %, and
the molar ratio of the total content of $SiO_2$ and $ZrO_2$ to the content of $Al_2O_3$ (($SiO_2$+$ZrO_2$)/$Al_2O_3$) is 2 to 13.

The glass 2 has a glass transition temperature Tg of 650° C. or higher.

Glass 3

Glass 3 is amorphous oxide glass configured such that
the content of $SiO_2$ is 56 to 65 mol %,
the content of $Al_2O_3$ is 5 to 20 mol %,
the content of $B_2O_3$ is 0 to 4 mol %,
the content of MgO is 3 to 28 mol %,
the content of $Li_2O$ is 1 to 10 mol %,
the total content of $SiO_2$ and $Al_2O_3$ ($SiO_2$+$Al_2O_3$) is 65 to 80 mol %,
the total content of MgO and CaO (MgO+CaO) is 11 to 30 mol %,
the total content of MgO, CaO, SrO, and BaO (MgO+CaO+SrO+BaO) is 12 to 30 mol %,
the total of the content of MgO, the 0.7×content of CaO, the content of $Li_2O$, the content of $TiO_2$, and the content of $ZrO_2$ (MgO+0.7CaO+$Li_2O$+$TiO_2$+$ZrO_2$) is 16 mol % or more,
the total of the 5×content of $Li_2O$, the 3×content of $Na_2O$, 3×content of $K_2O$, the 2×content of $B_2O_3$, the content of MgO, the 2×content of CaO, the 3×content of SrO, and the content of BaO (5$Li_2O$+3$Na_2O$+3$K_2O$+2$B_2O_3$+MgO+2CaO+3SrO+BaO) is 32 to 58 mol %,
the total of the content of $SiO_2$, the content of $Al_2O_3$, the content of $B_2O_3$, the content of $P_2O_5$, the 1.5×content of $Na_2O$, the 1.5×content of $K_2O$, the 2×content of SrO, the 3×content of BaO, and the content of ZnO ($SiO_2$+$Al_2O_3$+$B_2O_3$+$P_2O_5$+1.5$Na_2O$+1.5$K_2O$+2SrO+3BaO+ZnO) is 86 mol % or less,
the total of the content of $SiO_2$, the content of $Al_2O_3$, the content of $B_2O_3$, the content of $P_2O_5$, the content of $Na_2O$, the content of $K_2O$, the content of CaO, the 2×content of SrO, and the 3×content of BaO ($SiO_2$+$Al_2O_3$+$B_2O_3$+$P_2O_5$+$Na_2O$+$K_2O$+CaO+2SrO+3BaO) is 92 mol % or less,
the molar ratio of the content of CaO to the content of MgO (CaO/MgO) is 2.5 or less,
the molar ratio of the content of $Na_2O$ to the content of $Li_2O$ ($Na_2O$/$Li_2O$) is 5 or less,
the molar ratio of the content of $Li_2O$ to the total content of MgO and CaO ($Li_2O$/(MgO+CaO)) is 0.03 to 0.4,
the molar ratio of the content of $SiO_2$ to the total content of $Li_2O$, $Na_2O$, and $K_2O$ ($SiO_2$/($Li_2O$+$Na_2O$+$K_2O$)) is 4 to 22,
the molar ratio of the total content of $SiO_2$ and $ZrO_2$ to the content of $Al_2O_3$ (($SiO_2$+$ZrO_2$)/$Al_2O_3$) is 2 to 10,
the molar ratio of the total content of $TiO_2$ and $Al_2O_3$ to the total content of MgO and CaO (($TiO_2$+$Al_2O_3$)/(MgO+CaO)) is 0.35 to 2,
the molar ratio of the total content of MgO and CaO to the total content of MgO, CaO, SrO, and BaO ((MgO+CaO)/(MgO+CaO+SrO+BaO)) is 0.7 to 1,
the molar ratio of the content of BaO to the total content of MgO, CaO, SrO, and BaO (BaO/(MgO+CaO+SrO+BaO)) is 0.1 or less,
the molar ratio of the content of $P_2O_5$ to the total content of $B_2O_3$, $SiO_2$, $Al_2O_3$, and $P_2O_5$ ($P_2O_5$/($B_2O_3$+$SiO_2$+$Al_2O_3$+$P_2O_5$)) is 0.005 or less,
the glass transition temperature is 670° C. or higher, the Young's modulus is 90 GPa or more,
the specific gravity is 2.75 or less, and
the average linear expansion coefficient at 100 to 300° C. is within a range from $40 \times 10^{-7}$ to $70 \times 10^{-7}$/° C.

In this case, it is preferable that the maximum amplitude of vibration of the outer circumferential end portion of the substrate 1 in the thickness direction is 0.25 mm or less when an impact (acceleration) is applied to the substrate 1 under conditions of 70 (G) and 2 (msec) in the normal direction of the main surfaces of the substrate 1 in a state in which the inner circumferential end portion of the substrate 1 is fixed. Setting the maximum amplitude to 0.25 mm or less in this manner makes it possible to prevent the above-described contact. It should be noted that the above-mentioned impact test was carried out using an AVEX-SM-110-MP type tester manufactured by ARBROWN Co., Ltd.

Accordingly, the substrate 1 according to one embodiment is configured such that the substrate 1 has a diameter D of 85 mm or more and preferably 90 mm or more, the substrate 1 has a thickness T of 0.6 mm or less, and the maximum amplitude of vibration of the outer circumferential end portion of the substrate 1 in the thickness direction is 0.25 mm or less when an impact is applied to the substrate 1 under conditions of 70 (G) and 2 (msec) in the normal direction of the main surfaces of the substrate 1 in a state in which the inner circumferential end portion of the substrate 1 is fixed.

In one embodiment, the substrate 1 is preferably constituted by glass with a glass transition point Tg of 650° C. or higher, and more preferably a glass transition point Tg 680° C. or higher. The higher the glass transition point Tg is, the higher the thermal endurance is. Thus, the substrate deformation (e.g., flatness) occurring when the substrate 1 is heated can be reduced. In consideration of heat treatment for forming a magnetic film of a magnetic disk on the substrate 1, the glass transition point Tg is preferably set to 650° C. or higher from the viewpoint of suppressing thermal deformation.

Specifically, the substrate 1 is heated when a magnetic disk is produced by providing the substrate 1 with a metal film with a thickness of about 30 nm that includes a magnetic film and the like. The substrate 1 is provided with heat history during this heat treatment, and is thus likely to be deformed. Accordingly, in one embodiment, a difference between the flatness of the substrate 1 after heating at 730° C. and the flatness of the substrate 1 before heating (flatness after heating−flatness before heating) is preferably 4 μm or less. Limiting the difference therebetween in this manner makes it possible to obtain a flat magnetic disk as well as reduce fine vibration of a rotating magnetic disk.

In one embodiment, the substrate 1 is preferably formed of a material with a linear expansion coefficient of $70 \times 10^{-7}$ (1/K) or less, and more preferably a linear expansion coefficient of $60 \times 10^{-7}$ (1/K) or less. The lower limit of the linear expansion coefficient of the substrate 1 is $40 \times 10^{-7}$ (1/K), for example. The linear expansion coefficient as used herein refers to a linear expansion coefficient determined using a difference between thermal expansion at 100° C. and thermal expansion at 300° C. Employing the linear expansion coefficient as mentioned above makes it possible to suppress thermal expansion during heat treatment for forming a magnetic film and the like, and to suppress thermal strain of the substrate 1 occurring around a portion held by a holding member of a film formation apparatus that is used to hold and fix the faces of the outer circumferential end portion (referred to as "outer circumferential end faces" hereinafter) of the substrate 1. For example, a conventional aluminum alloy substrate has a linear expansion coefficient of $242 \times 10^{-7}$ (1/K) and a conventional glass substrate has a linear expansion coefficient of $95 \times 10^{-7}$ (1/K) or more, whereas the glass substrate 1 according to one embodiment has a linear expansion coefficient of $51 \times 10^{-7}$ (1/K). On the other hand, there is no particular need to determine the lower limit of the linear expansion coefficient of the substrate 1. However, if the substrate 1 has an excessively small linear expansion coefficient, a spindle may come into contact with and press against the circular hole portion of the substrate due to expansion of the spindle when the temperature rises inside the HDD, resulting in deformation of the substrate. Accordingly, it is more preferable to set the lower limit of the linear expansion coefficient to $20 \times 10^{-7}$ (1/K), for example.

In one embodiment, the substrate 1 preferably has a Vickers hardness Hv of 650 (kgf/mm$^2$) or more. In one embodiment, the substrate 1 preferably has a Knoop hardness Hk of 600 (kgf/mm$^2$) or more. Increasing the Vickers hardness Hv or Knoop hardness Hk makes it possible to suppress the formation of particles caused by chipping of the substrate 1 even if the substrate 1 comes into contact with another substrate 1 or the other member due to vibration caused by an external impact. Moreover, it is possible to prevent particles from being formed due to the outer circumferential end faces being held by a holding member of a film formation apparatus and thereby being chipped when forming a magnetic film and the like, and from adhering to the main surfaces of the substrate 1. For example, an aluminum alloy substrate has a Vickers hardness Hv of 128 (kgf/mm$^2$) and a conventional glass substrate has a Vickers hardness Hv of 620 (kgf/mm$^2$) or more, whereas the glass substrate 1 according to one embodiment has a Vickers hardness Hv of 741 (kgf/mm$^2$).

Figure 3:
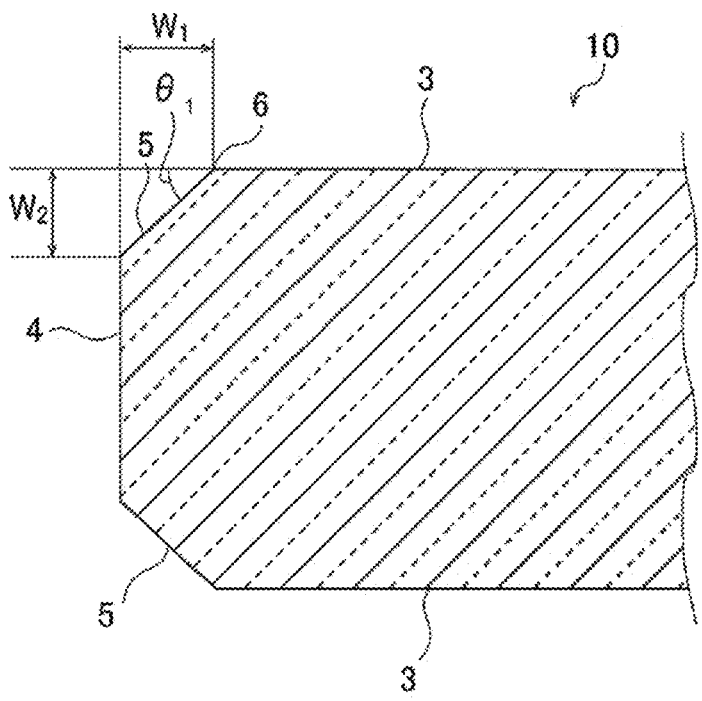
FIG. 3 is a diagram illustrating an example of the outer circumferential end portion of a magnetic disk according to one embodiment.
Figure 3:
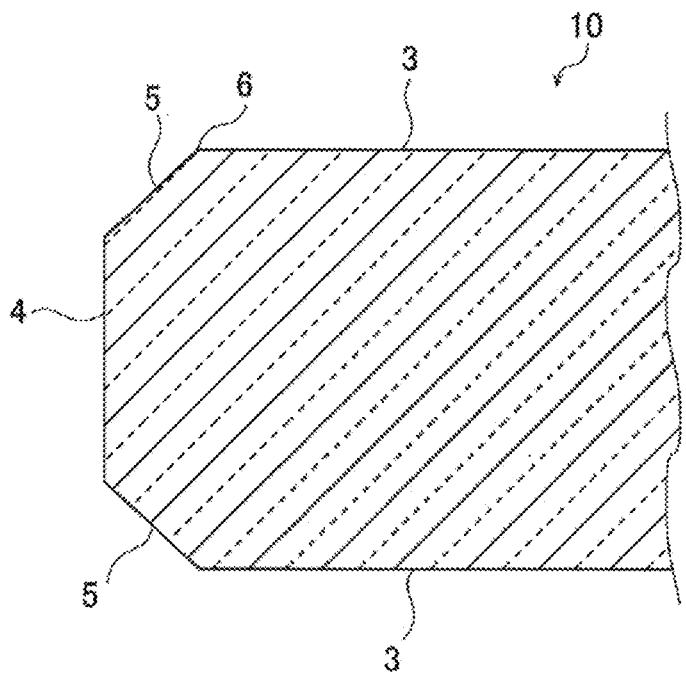

FIG. 3 is an enlarged view illustrating an example of the end portion of a magnetic disk. FIG. 3 shows two adjacent magnetic disks inside an HDD. In FIG. 3, magnetic films and the like are not shown because the magnetic films and the like have a thickness of about several tens of nanometers, which is much smaller than the thickness of the substrate 1.

The substrate 1 includes two main surfaces 3, a side wall face 4 that is arranged in a direction orthogonal to the two main surfaces 3, and two chamfered faces 5 that are arranged between the side wall face 4 and the two main surfaces 3. The side wall face 4 and the chamfered faces 5 are formed at both the outer circumferential end portion and the inner circumferential end portion of the substrate 1.

Magnetic disks 10 obtained by forming a magnetic film and the like on the surfaces of the substrate 1 are arranged adjacent to each other in an HDD as shown in FIG. 3. Here, when the magnetic disk 10 vibrates in the normal direction of the main surfaces 3 and comes into contact with the adjacent magnetic disk 10, a corner 6 that is located at the outer circumferential end portion and connects the main surface 3 and the chamfered face 5 is likely to come into contact with the adjacent magnetic disk 10. Due to this contact, a large impact is applied to a portion of the chamfered face 5 that is located in the vicinity of the corner 6.

The chamfered face 5 is formed by grinding an end face using a formed grindstone and then polishing the end face using a brush or the like. It has been revealed that, in the case of a substrate made of a glass material with a Young's modulus E of 90 GPa or more, more latent cracks or minute cracks are present on the surface of the chamfered face 5 compared with a conventional substrate made of glass with a low Young's modulus. The reason for this is not completely clear, but it is inferred that, since glass with a high Young's modulus commonly has high hardness, and thus a large load is applied thereto during grinding processing, deeper cracks are formed compared with a conventional case, and some of them remain as latent cracks or minute cracks after polishing. If an impact is applied to the corner 6 in such a state due to contact with a ramp member or the like, latent cracks or minute cracks may increase in size, resulting in the formation of particles from the magnetic disk 10 that are derived from a chipped portion of the corner 6 or chamfered face 5 of the substrate 1 and a magnetic film formed thereon. In this case, the larger a width $W_1$, which will be described later, is, the more likely it is that a portion of the corner 6 or chamfered face 5 may be chipped. The particles formed from the corner 6 or chamfered face 5 scatter in the HDD container, and often adhere to the read/write region of the magnetic disk 10.

Accordingly, in one embodiment, it is preferable to reduce the machining allowance for the chamfered face 5 formed in a chamfering step. In the case where the magnetic disk 10 has a large diameter of 85 mm or more and preferably 90 mm or more, and a small thickness of 0.600 mm or less, contact of the corner 6 is likely to occur, and therefore, it is preferable to reduce the number of latent cracks or minute cracks by reducing the machining allowance for the formation of the chamfered face 5. This makes it possible to suppress the formation of particles even if the corner 6 of the magnetic disk 10 comes into contact with the ramp member or the like due to large vibration. Here, the machining allowance for the formation of the chamfered face 5 refers to the value of the width $W_1$, which will be described later. In addition, the outer diameter may be adjusted by grinding away a certain amount of the outer circumference in an early stage of grindstone processing, but the study conducted by the inventor of the present invention revealed that such initial machining allowance has no influence on latent cracks or the like. It is inferred that the reason for this is that latent cracks or the like formed after removing the initial machining allowance are removed by the effect of the final machining allowance. Specifically, at least the outer circumferential face of the substrate 1 is provided with the chamfered faces 5. In this case, the width $W_1$ (see FIG. 3) of the chamfered face 5 in the radial direction of the substrate 1 is preferably 120 μm or less. The width $W_1$ is more preferably 90 μm or less. Adjusting the machining allowance for the formation of the chamfered face 5 such that the width $W_1$ is 120 μm or less makes it possible to reduce the number of latent cracks or minute cracks present on the chamfered face 5 even when the magnetic disk 10 in which a glass substrate with a high Young's modulus is used has an increased diameter and a reduced thickness, and thus contact of the corner 6 is likely to occur due to vibration. Accordingly, it is possible to suppress the formation of particles caused by chipping of a portion of the corner 6 or chamfered face 5 even when contact of the corner 6 occurs. It should be noted that the lower limit of the width $W_1$ is 20 μm, for example. If the width $W_1$ is less than 20 μm, chipping may occur in a substrate manufacturing step, a film formation step, or the like performed after shaping processing due to the excessively small chamfered face 5. The chamfered face 5 may have a linear shape as shown in FIG. 3, a circular arc shape that protrudes outward, or a curved shape, in a cross-sectional view taken along a line that passes through the center of the magnetic disk 10 and extends in the radial direction. In this case, the chamfered face 5 refers to such a portion that inclination angles of tangents are 5 to 85 degrees at positions where that portion is in contact with the side wall face 4 and the main surface 3. FIG. 3 shows the chamfered face 5 that forms a constant inclination angle $\theta_1$ with the main surface 3.

In one embodiment, it is preferable that a ratio of a value obtained by multiplying, by 2, a width $W_2$ (see FIG. 3) of the chamfered face 5 in the thickness direction of the substrate 1 on the outer circumference of the substrate 1 to the thickness T, namely $(2 \cdot W_2)/T$ is 0.4 or less. The ratio $(2 \cdot W_2)/T$ is preferably 0.3 or less. If the ratio $(2 \cdot W_2)/T$ exceeds 0.4, the side wall face 4 has an excessively small size, and therefore, the outer circumferential end portion may be chipped or cracked when the outer circumferential end portion is held during the formation of a magnetic film and the like or a bias voltage is applied.

Furthermore, in one embodiment, regarding the Young's modulus E (GPa) and the thickness T (mm), a value of $E \cdot T^3$ is preferably 3 to 18 (GPa·mm³), more preferably 3 to 16 (GPa·mm³), and even more preferably 5 to 15 (GPa·mm³). Setting the value of $E \cdot T^3$ within this range makes it possible to suppress contact of the magnetic disk 10 caused by vibration. If the value of $E \cdot T^3$ is less than 3 (GPa·mm³), the contact of the magnetic disk 10 caused by vibration is likely to be induced. If the value of $E \cdot T^3$ exceeds 18 (GPa·mm³), the Young's modulus E is increased because the thickness of the magnetic disks 10 cannot be increased in view of ensuring the number of magnetic disks 10 incorporated in an HDD. This is not preferable from the viewpoint of the production efficiency of the substrate 1 for a magnetic disk because an increase in the Young's modulus E makes it likely that the substrate 1 becomes harder than necessary, resulting in a longer time to polish the main surfaces 3.

In addition, in one embodiment, regarding the Young's modulus E (GPa) and the density ρ (g/cm³), the value of a specific elastic modulus calculated as E/ρ is preferably 36 (GPa·cm³/g) or more. Even when the Young's modulus is high, an increased density may cause larger vibration due to the weight of a substrate itself. Although there is no particular need to determine the upper limit of the specific elastic modulus, it may be 41 (GPa·cm³/g), for example, from the viewpoint of productivity.

In the case where such a substrate 1 is provided in an HDD, the number of substrates 1 to be provided in the HDD depends on the thickness T of the substrate 1. A magnetic film and the like formed on the substrate 1 have a film thickness of several tens of nanometers, which is thin enough to be ignored compared with the thickness T of the substrate 1. For example, nine or more substrates 1 can be provided when the substrate 1 has a thickness T of 0.635 mm, ten or more substrates 1 can be provided when the substrate 1 has a thickness T of 0.5 mm, and twelve or more substrates 1 can be provided when the substrate 1 has a thickness T of 0.38 mm. As described above, the number of the substrates 1 to be provided varies depending on the thickness T of the substrate 1.

Accordingly, the storage capacity can be increased by reducing the thickness of the substrate 1 and increasing the number of the substrates 1 to be provided. In this case, the substrate 1 according to this embodiment is less likely to come into contact with another substrate 1 or another member due to vibration even if the thickness T is reduced.

Moreover, in one embodiment, it is preferable that the substrate 1 is not broken when the substrate 1 is subjected to an impact test in which the inner circumferential end portion of the substrate 1 is fixed in a manner similar to the case where a clamp for a magnetic disk is used and an impact is applied to the substrate 1 under conditions of 600 G and 2 milliseconds. Such a substrate 1 is preferable from the viewpoint of an increase in durability because the substrate 1 is not broken even when a large impact is applied to an HDD. This substrate 1 can be achieved using the glass 1 to 3 described above.

In one embodiment, the material of the substrate 1 preferably has a Q-value (Quality Factor) of 1500 or less under the conditions of 3000 Hz and room temperature (25° C.). The Q-value is obtained by dividing vibration energy stored in the vibrating substrate 1 in one cycle by energy dissipated from the vibrating substrate 1, and the smaller this value is, the larger the attenuation of the vibration is. Accordingly, when a material with a smaller Q-value is used, the vibration can be attenuated more quickly. Therefore, the number of contacts with the adjacent substrate 1 or the ramp in the HDD can be reduced and an impact during the contact can be mitigated, thus making it possible to suppress an adverse influence such as the formation of particles due to contact. It should be noted that the above-mentioned Q-value under the conditions of 3000 Hz and room temperature is more preferably 1300 or less.

It should be noted that a Q-value under the condition of 3000 Hz was obtained as follows. First, a laser Doppler vibrometer (LDV) was used to vibrate a substrate 1 rotated using a spin stand, the vibration was measured by irradiating a portion located at substantially the outer circumferential end of the substrate 1 with a laser beam, and a frequency response function (the horizontal axis represents the frequency (Hz), and the vertical axis represents the NRRO (Non Repeatable Runout) Amplitude (nm)) was obtained by performing Fourier transformation on the obtained data as appropriate. Next, a half-power band width method (a method for calculating a Q-value using frequencies f1 and f2 (>f1) corresponding to a value that is 3 dB smaller than the peak value of NRRO and a frequency f0 (resonance frequency) corresponding to the peak value) was used to determine a Q-value (=f0/(f2−f1)) for each peak observed in the frequency response function. The obtained measurement results were plotted in an XY plane with the horizontal axis representing the frequency and the vertical axis representing the Q-value, and an approximate straight line was determined by performing linear approximation based on the least squares method. A Q-value under the condition of 3000 Hz was obtained from the determined approximate straight line or by extrapolating the approximate straight line as needed.

It should be noted that all the substrates 1 used for evaluation using a laser Doppler vibrometer had an outer diameter of 95 mm, an inner diameter of 25 mm, and a thickness of 0.635 mm. The measurement was performed under the conditions that the rotation rate of the substrate was 6900 rpm, the measurement position was located 46.5 mm away from the center of the substrate in the radial direction (a position that is 1 mm inside from the outer circumferential end), and the temperature was room temperature.

In one embodiment, the material of the substrate 1 preferably has a $\rho \cdot (1-\nu)^2 \cdot Q/E$ value of less than 25 (g/cm$^3$/Gpa), where $\rho$ represents the density (g/cm$^3$) of the material of the substrate 1 at room temperature, Q represents the Q-value of the material of the substrate 1 under the conditions of 3000 Hz and room temperature, E represents the Young's modulus (GPa) of the material of the substrate 1 at room temperature, and $\nu$ is the Poisson's ratio of the material at room temperature. The amplitude of the outer circumferential end portion of the substrate 1 is proportional to $\rho \cdot (1-\nu)^2/E/\xi$ (where $\xi$ represents the attenuation ratio of the material of the substrate 1), and the attenuation ratio $\xi$ is represented as $1/(2 \cdot Q)$ (where Q represents the Q-value). Therefore, the above-mentioned amplitude is proportional to $2 \cdot \rho \cdot (1-\nu)^2 \cdot Q/E$. Here, it was found that setting $2 \cdot \rho (1-\nu)^2 \cdot Q/E$ to less than 25 (g/cm$^3$/Gpa) makes it possible to efficiently reduce the amplitude of the vibration in a certain frequency band, that is, to set the RSS of flutter vibration (Root of Sum of Squares: total of flutter vibration amounts) at 1000 to 4000 Hz to less than 80 nm. Specifically, the RSS at 1000 to 4000 Hz is a square root of the integrated value of the square values of the amplitudes of flutter vibrations between 1000 Hz and 4000 Hz. That is, setting $2 \cdot \rho(1-\nu)^2 \cdot Q/E$ to less than 25 (g/cm$^3$/Gpa) makes it possible to reduce the RSS in a region between 1000 Hz and 4000 Hz. It is more preferable to set $2 \cdot \rho(1-\nu)^2 \cdot Q/E$ to 20 (g/cm$^3$/Gpa) or less because the RSS in a region between 1000 Hz and 4000 Hz can be set to 68 nm or less.

It should be noted that flutter vibration in a frequency band of less than 1000 Hz has a less influence due to the recent progress of a head servo technology, whereas flutter vibration in a band of more than 4000 Hz is originally small. Accordingly, it is important to reduce flutter vibration in a bad between 1000 to 4000 Hz.

The substrate 1 according to this embodiment has such features.

Such a substrate 1 is produced as follows, for example. Here, a case where a glass substrate is used as the substrate 1 will be described as one example.

First, processing for molding a glass blank that serves as a raw material of a plate-shaped substrate for a magnetic disk having two main surfaces is performed. Next, the glass blank is roughly ground. Then, shape processing and end face polishing are performed on the glass blank. Then, precision grinding is performed on the main surfaces of a substrate obtained from the glass blank, using fixed abrasive particles. Then, first main-surface polishing, chemical strengthening, and second main-surface polishing are performed on the substrate. It should be noted that, although the substrate is produced in the above-mentioned flow in this embodiment, it is not necessary to always perform the above-mentioned processes, and the order of these processes may be changed as appropriate or these processes may be omitted as appropriate. For example, out of the above-described processes, precision grinding, first polishing, chemical strengthening need not be carried out. Hereinafter, each of the processes will be described.

(a) Molding of Glass Blank

A press molding method can be used to mold the glass blank, for example. A circular glass blank can be obtained using a press molding method. Also, a glass blank can be manufactured using a known manufacturing method such as a downdraw method, a redraw method, or a fusion method. A disk-shaped glass substrate, which is the base of a substrate for a magnetic disk, can be obtained by performing, as appropriate, shape processing on the plate-shaped glass blank produced using these known manufacturing methods.

(b) Rough Grinding

In rough grinding, main surfaces on both sides of the glass blank are ground. Loose abrasive particles are used as an abrasive material, for example. In the rough grinding, grinding is performed such that the glass blank is brought approximately closer to a target substrate thickness and a target flatness of the main surfaces. It should be noted that rough grinding is performed according to the dimensional accuracy or the surface roughness of the molded glass blank, and may be omitted in some cases.

(c) Shape Processing

Next, shape processing is performed. In the shape processing, after the glass blank is molded, a circular hole and an outer circumference are formed using a known processing method to obtain a disk-shaped substrate provided with a circular hole (circular hole formation step). Then, chamfering of end faces of the substrate is carried out (chamfering step). Accordingly, a side wall face 4 orthogonal to the main surfaces 3 and chamfered faces 5 that are inclined with respect to the main surfaces 3 and are located between the side wall face 4 and the main surfaces 3 on both sides are formed on the end faces of the substrate. In the chamfering step, the side wall face 4 and two chamfered face 5 may be simultaneously formed by grinding the end face of the substrate using a formed grindstone.

(d) End Face Polishing

Next, end face polishing is performed on the substrate. The end face polishing is processing for performing polishing by supplying a polishing liquid containing loose abrasive particles between a polishing brush and the outer circumferential end face (the side wall face 4 and the chamfered faces 5) and inner circumferential end face (the side wall face 4 and the chamfered faces 5) of the substrate and moving the polishing brush and the substrate relative to each other. In the end face polishing, the inner circumferential end face and the outer circumferential end face of the substrate are polishing targets, and the inner circumferential end face and the outer circumferential end face are polished into mirror surfaces.

(e) Precision Grinding

Next, precision grinding is performed on the main surfaces of the substrate. For example, the main surfaces 3 of the substrate are ground using a double-side grinding apparatus provided with a planetary gear mechanism. In this case, grinding is performed with the surface plates provided with fixed abrasive particles, for example. Alternatively, grinding can also be performed using loose abrasive particles. It should be noted that the precision grinding need not be performed in some cases.

(f) First Polishing

Next, first polishing is performed on the main surfaces 3 of the substrate. The first polishing is performed using loose abrasive particles and polishing pads attached to the surface plates. The first polishing removes cracks and warping remaining on the main surfaces 3 in the case where precision grinding is performed with fixed abrasive particles, for example. In the first polishing, surface roughness of the main surfaces 3, or an arithmetic average roughness Ra, for example, can be reduced while preventing the shape of the end portions of the main surfaces 3 from being excessively recessed or protruding.

Although there is no particular limitation on the loose abrasive particles used in the first polishing, cerium oxide abrasive particles, zirconia abrasive particles, or the like are used, for example. It should be noted that the first polishing need not be performed in some cases.

(g) Chemical Strengthening

In some cases, a substrate 1 according to one embodiment may be chemically strengthened as appropriate. In the case where chemical strengthening is performed, a melt obtained by heating potassium nitrate, sodium nitrate, or a mixture thereof, for example, is used as a chemical strengthening liquid. By immersing the substrate in the chemical strengthening liquid, lithium ions and sodium ions in the glass composition that are present in a surface layer of the substrate are respectively substituted with sodium ions and potassium ions in the chemical strengthening liquid whose ion radii are relatively large, whereby compressive stress layers are formed on the surface layer portions and thus the substrate is strengthened.

Although the timing at which the chemical strengthening is performed is determined as appropriate, it is particularly preferable to perform the polishing after the chemical strengthening because the surface can be smoothed and foreign matter attached to the surface of the substrate can be removed through the chemical strengthening.

(h) Second Polishing (Mirror-Polishing)

Next, second polishing is performed on the chemically strengthened substrate. The second polishing is for the purpose of performing mirror-polishing on the main surfaces 3. In the second polishing as well, polishing is performed using a polishing apparatus having a configuration similar to the configuration of the polishing apparatus used in the first polishing. In the second polishing, the type and the particle size of loose abrasive particles are changed relative to the first polishing and mirror polishing is performed using resin polishers having a low hardness as the polishing pads. Accordingly, the roughness of the main surfaces 3 can be reduced while preventing the shape of the end portions of the main surfaces 3 from being excessively recessed or protruding. The main surfaces 3 preferably have an arithmetic average roughness Ra (JIS B 0601 2001) of 0.2 nm or less.

Then, the substrate is washed, and thus a substrate 1 can be obtained.

WORKING EXAMPLES, COMPARATIVE EXAMPLES, CONVENTIONAL EXAMPLES

In order to investigate the effects of the substrate 1, various substrates were produced (Conventional Examples 1 and 2, Comparative Examples 1 and 2, Working Examples 1 to 12, Working Examples 61 to 67, Working Examples 81 to 84, Working Examples 111 to 114, and Working Examples 121 to 124).

A glass substrate or aluminum alloy substrate was used as the substrate. Glass 4 having the following composition was used for the substrates of Conventional Example 1 and Comparative Example 1. The above-described glass 1 was used for substrates 1 of Working Examples 1 and 2, the above-described glass 2 was used for substrates 1 of Working Examples 3 to 5, the above-described glass 3 was used for substrates 1 of Working Examples 6 to 10, glass 5 and 6, which is amorphous aluminosilicate glass with a Young's modulus E of 100 (GPa) or more having a composition different from those of glass 1 to 4, was used for substrates 1 of Working Examples 11 and 12, and the above-described glass 3 was used for substrates 1 of Working Examples 61 to 67 and Working Examples 81 to 84. The glass 5 was used for substrates 1 of Working Examples 111 to 114, and the glass 6 was used for substrates 1 of Working Examples 121 to 124. It should be noted that all the substrates were not chemically strengthened.

The glass 1 to 3, 5, and 6 had a specific elastic modulus value of 36 (GPa·cm$^3$/g) or more. That value of the glass 4 was less than 36.

Glass 4

The glass 4 is amorphous glass containing
$SiO_2$, $Al_2O_3$, one or more alkali metal oxides selected from the group consisting of $Li_2O$, $Na_2O$, and $K_2O$, one or more alkali earth metal oxides selected from the group consisting of MgO, CaO, SrO, and BaO, and one or more oxides selected from the group consisting of $ZrO_2$, $HfO_2$, $Nb_2O_5$, $Ta_2O_5$, $La_2O_3$, $Y_2O_3$, and $TiO_2$,
and has a composition in which
the content of $SiO_2$ is 50 mol % or more,
the content of $Al_2O_3$ is 3 mol % or more,
the total content of $SiO_2$ and $Al_2O_3$ is 70 to 85 mol %,
$Li_2O$ and $Na_2O$ are contained, the content of $Li_2O$ being 4.3 mol % or more,
the content of $Na_2O$ being 5 mol % or more, and
the total content of $Li_2O$ and $Na_2O$ being 24 mol % or less,
the total content of the alkali metal oxides and the alkali earth metal oxides is 8 mol % or more,
the molar ratio of the total content of the oxides to the total content of the alkali metal oxides and the alkali earth metal oxides (($ZrO_2$+$HfO_2$+$Nb_2O_5$+$Ta_2O_5$+$La_2O_3$+$Y_2O_3$+$TiO_2$)/($Li_2O$+$Na_2O$+$K_2O$+MgO+CaO+SrO+BaO)) is 0.035 or more, and
MgO and CaO are contained,
the content of MgO being less than 3 mol %,
the content of CaO being 4 mol % or less, and
the molar ratio of the content of MgO to the content of CaO (MgO/CaO) being 0.130 to 0.700.

The produced substrates had a size with an outer diameter (diameter) of 85 mm to 97 mm and an inner diameter (circular hole diameter) of 25 mm. With the specification of the chamfered faces, the widths $W_1$ in the radial direction were 60 μm to 150 μm, and the widths $W_2$ in the thickness direction were 60 μm to 150 μm. Specifically, in Conventional Examples 1 and 2 with a thickness of more than 0.6 mm, the width $W_1$ in the radial direction was 150 μm, and the width $W_2$ in the thickness direction was 150 μm. In Comparative Examples 1 and 2 and Working Examples 1 to 12 with a thickness of 0.6 mm or less, the width $W_1$ was 100 μm, and the width $W_2$ was 100 μm. The widths $W_1$ and the widths $W_2$ of Working Examples 61 to 67 and 81 to 84 are shown in Tables 3A to 3D below. Accordingly, in the case where the width $W_1$ and the width $W_2$ are equal to each other, the inclination angle $\theta_1$ (see FIG. 3) is 45 degrees. It should be noted that, in the shape processing, when the outer circumference of a substrate was formed, a cutting line was formed through scribing in a vertical direction using a diamond scriber, and then cutting to the opposite face was performed along the cutting line. In the subsequent chamfering step, the chamfered faces were formed using a formed grindstone.

Experiment 1

The produced substrates of Conventional Examples 1 and 2, Comparative Examples 1 and 2, and Working Examples 1 to 12 were attached to an evaluation apparatus provided with a high-speed camera, and their maximum amplitudes were determined. This evaluation apparatus can apply an external impact (acceleration) of any magnitude, and capture moving images of motion (vibration) of the outer circumferential end portion of a substrate that occurs due to the external impact. Then, the evaluation apparatus can measure the shift of the outer circumferential end portion in the normal direction of the main surfaces by analyzing the moving images.

This evaluation apparatus was used to perform an impact test in which an impact was applied to a substrate under the conditions of 70 (G) and 2 (msec) in the normal direction of the main surfaces of the substrate, and measure vibration of the outer circumferential end portion in the normal direction of the main surfaces. The measurement results are represented as waveform data as shown in FIG. 2. This waveform data was used to determine, as the maximum amplitude, the maximum shift amount of the outer circumferential end portion of the substrate from the center with a shift amount of zero toward either side in the normal direction.

It should be noted that a ramp for a ramp load mechanism for a magnetic head is incorporated in an actual HDD, and when magnetic disks are mounted, there are 0.25-mm gaps extending from two main surfaces. That is, a gap between ramps that a magnetic disk enters has a length obtained by adding 0.5 mm to the thickness of the magnetic disk. The actual HDD is designed to have a fixed gap, even if the thickness of a substrate is changed. On the other hand, the evaluation apparatus is not provided with this ramp. Thus, whether or not a substrate comes into contact with another member such as a ramp (the adjacent substrate, the ramp, or the HDD container) in an actual HDD due to vibration of the substrate is determined using the maximum amplitude of the vibration of the substrate, and if the maximum amplitude is 0.25 mm or less, it can be determined that contact with the ramp does not occur. If the maximum amplitude is more than 0.25 mm, contact with another member is quite likely to occur. The average value of the maximum amplitudes of three substrates was used as the maximum amplitude. The substrate did not rotate in this evaluation, and evaluation was made in a stationary state.

It should be noted that the thicknesses of a magnetic film and the like formed on the main surfaces in a media process can be substantially ignored because the thicknesses were about 100 nm or less.

Tables 1, 2A, and 2B show the results of evaluation of the maximum amplitudes.

An aluminum alloy ("Al alloy") used in Conventional Example 2 and Comparative Example 2 was an Al—Mg alloy having the following composition. The Al—Mg alloy contains Mg in an amount of 3.5 to 5 mass %, Si in an amount of 0 to 0.05 mass %, Fe in an amount of 0 to 0.1 mass %, Cu in an amount of 0 to 0.12 mass %, Mn in an amount of 0 to 0.3 mass %, Cr in an amount of 0 to 0.1 mass %, Zn in an amount of 0 to 0.5 mass %, Ti in an amount of 0 to 0.1 mass %, and Al as the remainder. Furthermore, a film made of an Ni—P alloy (containing P in an amount of 10 mass % and Ni as the remainder) was formed on the surface of the substrate made of the Al—Mg alloy through electroless plating such that the film covered the entire surface of the substrate. The thickness of a substrate on which a plating film is formed includes the thickness of the film.

TABLE 1

|  | Conv. Ex. 1 | Conv. Ex. 2 | Comp. Ex.1 | Comp. Ex.2 | Work. Ex. 1 | Work. Ex. 2 |
| --- | --- | --- | --- | --- | --- | --- |
| Material | Glass 4 | Al alloy | Glass 4 | Al alloy | Glass 1 | Glass 1 |
| Young's modulus E (GPa) | 83 | 71 | 83 | 71 | 95 | 95 |
| Thickness T (mm) | 0.635 | 0.635 | 0.5 | 0.5 | 0.55 | 0.5 |
| Maximum amplitude (mm) | 0.15 | 0.21 | 0.29 | 0.35 | 0.20 | 0.24 |

As is clear from Table 1, in Conventional Examples 1 and 2 in which the thickness T exceeded 0.6 mm, although the Young's modulus was less than 90 (GPa), the maximum amplitude was small due to the large thickness T, and thus the substrate did not come into contact with another member. However, as shown in Comparative Examples 1 and 2, when the thickness T is 0.6 mm or less, the maximum amplitude exceeds 0.25 mm, and thus the substrate is quite likely to come into contact with another member. On the contrary, in Working Examples 1 and 2, although the thickness T was 0.6 mm or less, the maximum amplitude was 0.25 mm or less due to the Young's modulus of 90 (GPa) or more.

TABLE 2A

|  | Work. Ex. 3 | Work. Ex. 4 | Work. Ex. 5 | Work. Ex. 6 | Work. Ex. 7 | Work. Ex. 8 | Work. Ex. 9 | Work. Ex. 10 |
| --- | --- | --- | --- | --- | --- | --- | --- | --- |
| Material | Glass 2 | Glass 2 | Glass 2 | Glass 3 | Glass 3 | Glass 3 | Glass 3 | Glass 3 |
| Young's modulus E (GPa) | 95 | 95 | 95 | 95 | 95 | 95 | 95 | 95 |

TABLE 2A-continued

|  | Work. Ex. 3 | Work. Ex. 4 | Work. Ex. 5 | Work. Ex. 6 | Work. Ex. 7 | Work. Ex. 8 | Work. Ex. 9 | Work. Ex. 10 |
|---|---|---|---|---|---|---|---|---|
| Thickness T (mm) | 0.6 | 0.55 | 0.5 | 0.6 | 0.55 | 0.5 | 0.5 | 0.5 |
| Outer diameter (diameter) (mm) | 95 | 95 | 95 | 95 | 95 | 95 | 97 | 85 |
| Maximum amplitude (mm) | 0.15 | 0.20 | 0.24 | 0.15 | 0.20 | 0.24 | 0.25 | 0.20 |

TABLE 2B

|  | Work. Ex. 11 | Work. Ex. 12 |
|---|---|---|
| Material | Glass 5 | Glass 6 |
| Young's modulus E (GPa) | 102 | 107 |
| Thickness T (mm) | 0.5 | 0.5 |
| Outer diameter (diameter) (mm) | 95 | 95 |
| Maximum amplitude (mm) | 0.20 | 0.22 |

As in Working Examples 1 and 2, in Working Examples 3 to 12 as well, although the thickness T was 0.6 mm or less, the maximum amplitude was 0.25 mm or less due to the Young's modulus of 90 (GPa) or more.

Accordingly, as is clear from Tables 1, 2A, and 2B, even if the substrate 1 has a diameter D of 85 mm or more and a thickness T of 0.6 mm or less, the maximum amplitude is 0.25 mm or less when the material of the substrate 1 has a Young's modulus E of 90 (GPa) or more. Therefore, the substrate 1 is prevented from coming into contact with another member due to vibration caused by an external impact. This can suppress the formation of particles in an HDD.

Experiment 2

Furthermore, an impact test was performed on substrates 1 with the chamfered faces 5 having various widths $W_1$ and $W_2$ (Working Examples 61 to 67, Working Examples 81 to 84, Working Examples 111 to 114, and Working Examples 121 to 124) and then quality evaluation was performed on the substrates 1, using the substrates 1 of Working Example 6, Working Example 8, Working Example 11, and Working Example 12 as standards.

It should be noted that the widths $W_1$ and $W_2$ were varied by varying the grindstone shape and processing conditions in a chamfering process using a formed grindstone. The widths $W_1$ and $W_2$ of the substrate 1 of Working Example 6 were changed in Working Examples 61 to 67, the widths $W_1$ and $W_2$ of the substrate 1 of Working Example 8 were changed in Working Examples 81 to 84, the widths $W_1$ and $W_2$ of the substrate 1 of Working Example 11 were changed in Working Examples 111 to 114, and the widths $W_1$ and $W_2$ of the substrate 1 of Working Example 12 were changed in Working Examples 121 to 124. Accordingly, the materials, Young's moduli E, thicknesses, and outer diameters of Working Examples 61 to 67 were the same as those of Working Example 6, the materials, Young's moduli E, thicknesses, and outer diameters of Working Examples 81 to 84 were the same as those of Working Example 8, the materials, Young's moduli E, thicknesses, and outer diameters of Working Examples 111 to 114 were the same as those of Working Example 11, and the materials, Young's moduli E, thicknesses, and outer diameters of Working Examples 121 to 124 were the same as those of Working Example 12.

In the quality evaluation performed on the produced substrates 1, a commercially available HDD was disassembled, the substrate 1 of each working example and a spacer were attached to a spindle, and in addition, a mock ramp member made of engineering plastic was attached so as to overhang the surface of the substrate. A gap between the ramp member and the substrate was set to 0.25 mm. An impact test in which an impact was applied to the substrate 1 under the conditions of 200 (G) and 2 (msec) in the normal direction of the main surfaces of the substrate 1 was performed in the state in which the substrate 1 was stopped. This test is an acceleration test in which the outer circumferential end portion of the substrate 1 is intentionally collided against the ramp member. Then, the particle distribution around a portion of the surface of the substrate 1 that had come into contact with the ramp member was observed. It should be noted that relative evaluation was employed because numerical conversion was difficult.

Rank 1: Substantially no particles

Rank 2: Not too many particles

Rank 3: Many particles

Tables 3A to 3D below show the evaluation results.

The smaller the rank number is, the better the quality evaluation is, and Rank 1 is the best evaluation.

TABLE 3A

|  | Work. Ex. 61 | Work. Ex. 62 | Work. Ex. 63 | Work. Ex. 64 | Work. Ex. 65 | Work. Ex. 66 | Work. Ex. 67 |
|---|---|---|---|---|---|---|---|
| Material | Glass 3 | Glass 3 | Glass 3 | Glass 3 | Glass 3 | Glass 3 | Glass 3 |
| Thickness T (mm) | 0.6 | 0.6 | 0.6 | 0.6 | 0.6 | 0.6 | 0.6 |
| Width $W_1$ (μm) | 60 | 90 | 120 | 150 | 90 | 90 | 60 |
| Width $W_2$ (μm) | 60 | 90 | 120 | 150 | 60 | 120 | 90 |
| Quality evaluation | Rank 1 | Rank 1 | Rank 2 | Rank 3 | Rank 1 | Rank 1 | Rank 1 |

TABLE 3B

|  | Work. Ex. 81 | Work. Ex. 82 | Work. Ex. 83 | Work. Ex. 84 |
| --- | --- | --- | --- | --- |
| Material | Glass 3 | Glass 3 | Glass 3 | Glass 3 |
| Thickness T (mm) | 0.5 | 0.5 | 0.5 | 0.5 |
| Width $W_1$ (μm) | 60 | 90 | 120 | 150 |
| Width $W_2$ (μm) | 60 | 90 | 120 | 150 |
| Quality evaluation | Rank 1 | Rank 1 | Rank 2 | Rank 3 |

TABLE 3C

|  | Work. Ex. 111 | Work. Ex. 112 | Work. Ex. 113 | Work. Ex. 114 |
| --- | --- | --- | --- | --- |
| Material | Glass 5 | Glass 5 | Glass 5 | Glass 5 |
| Thickness T (mm) | 0.5 | 0.5 | 0.5 | 0.5 |
| Width $W_1$ (μm) | 60 | 90 | 120 | 150 |
| Width $W_2$ (μm) | 60 | 90 | 120 | 150 |
| Quality evaluation | Rank 1 | Rank 1 | Rank 2 | Rank 3 |

TABLE 3D

|  | Work. Ex. 121 | Work. Ex. 122 | Work. Ex. 123 | Work. Ex. 124 |
| --- | --- | --- | --- | --- |
| Material | Glass 6 | Glass 6 | Glass 6 | Glass 6 |
| Thickness T (mm) | 0.5 | 0.5 | 0.5 | 0.5 |
| Width $W_1$ (μm) | 60 | 90 | 120 | 150 |
| Width $W_2$ (μm) | 60 | 90 | 120 | 150 |
| Quality evaluation | Rank 1 | Rank 1 | Rank 2 | Rank 3 |

It is clear from Tables 3A to 3D that setting the width $W_1$ to 120 μm or less makes it possible to reduce the number of particles. Furthermore, it is clear that when the width $W_1$ is set to 90 μm or less, the number of particles is further reduced. Accordingly, in the case where the substrate 1 has a diameter D of 85 mm or more and a thickness T of 0.6 mm or less, and the material of the substrate 1 has a Young's modulus E of 90 (GPa), setting the width $W_1$ to 120 μm or less makes it possible to further suppress the number of particles attaching to the main surfaces of the substrate 1 in an HDD.

As described above, although a substrate for a magnetic disk and a magnetic disk according to the present invention have been described in detail, the present invention is not limited to the above-described embodiment and examples etc., and it will be appreciated that various improvements and modifications can be made without departing from the gist of the present invention.

An aspect of this disclosure is a substrate for a magnetic disk having a disk shape.

The substrate has a diameter D of 85 mm or more and a thickness T of 0.6 mm or less, and a material of the substrate has a Young's modulus E of 90 GPa or more.

It is preferable that the diameter D is 90 mm or more.

It is preferable that, when an impact is applied to the substrate under conditions of 70 (G) and 2 (msec) in a normal direction of main surfaces of the substrate in a state in which an inner circumferential end portion of the substrate is fixed, the maximum amplitude of vibration in a thickness direction of an outer circumferential end portion of the substrate is 0.25 mm or less.

Another aspect of this disclosure is a substrate for a magnetic disk having a disk shape.

The substrate has a diameter D of 85 mm or more and a thickness T of 0.6 mm or less, and when an impact is applied to the substrate under conditions of 70 (G) and 2 (msec) in a normal direction of main surfaces of the substrate in a state in which an inner circumferential end portion of the substrate is fixed, the maximum amplitude of vibration in a thickness direction of an outer circumferential end portion of the substrate is 0.25 mm or less.

It is preferable that the diameter D is 90 mm or more.

It is preferable that the substrate is a glass substrate made of glass having a glass transition point of 650° C. or higher.

It is preferable that a difference between flatness of the substrate after heating at 730° C. and flatness of the substrate before heating is 4 μm or less.

It is preferable that the substrate is made of a material with a linear expansion coefficient of $70 \times 10^{-7}$ (1/K) or less.

It is preferable that the substrate has a Vickers hardness Hv of 650 (kgf/mm$^2$) or more.

It is preferable that the substrate has a Knoop hardness Hk of 600 (kgf/mm$^2$) or more.

It is preferable that a chamfered face is formed on at least an outer circumferential end face of the substrate, and a ratio of a width $W_1$ of the chamfered face in a radial direction of the substrate to a radius R of the substrate, namely $W_1/R$, is 0.0025 or less.

It is preferable that a ratio of a value obtained by multiplying, by 2, a width $W_2$ of the chamfered face in a thickness direction of the substrate to the thickness T, namely $(2 \cdot W_2)/T$ is 0.4 or less.

It is preferable that, regarding the Young's modulus E and the thickness T of the substrate, a value of $E \cdot T^3$ is 3 to 18 (GPa·mm$^3$).

It is preferable that the material has a Q-value of 1500 or less under conditions of 3000 Hz and room temperature.

It is preferable that the material has a $\rho \cdot (1-\nu)^2 \cdot Q/E$ value of less than 25 (g/cm$^3$/GPa), where $\rho$ represents a density (g/cm$^3$) of the material at room temperature, Q represents a Q-value of the material under conditions of 3000 Hz and room temperature, E represents a Young's modulus (GPa) of the material at room temperature, and $\nu$ represents a Poisson's ratio of the material at room temperature.

Yet another aspect of this disclosure is a magnetic disk, wherein a surface of the substrate for a magnetic disk mentioned above is provided with at least a magnetic film.

With the above-described substrate for a magnetic disk, and the above-described magnetic disk, the formation of particles caused by an external impact can be suppressed even if the diameter of the substrate for a magnetic disk is increased and the thickness thereof is reduced.

What is claimed is:

1. A substrate for a magnetic disk having a disk shape, wherein
    the substrate has a diameter D of 85 mm or more and 100 mm or less, and a thickness T of 0.3 mm or more and 0.5 mm or less,
    regarding a Young's modulus E and the thickness T of the substrate, a value of $E \cdot T^3$ is 3 to 18 (GPa·mm$^3$),
    a material of the substrate has a Q-value of 1500 or less under conditions of 3000 Hz and room temperature, and
    the substrate is a glass substrate made of glass with a glass transition point of 650° C. or higher.

2. The substrate for a magnetic disk according to claim 1, wherein
    a chamfered face is formed on at least an outer circumferential end face of the substrate, and
    a width $W_1$ of the chamfered face in a radial direction of the substrate is 20 μm or more and 90 μm or less.

3. A magnetic disk, wherein
a surface of the substrate for a magnetic disk according to claim 2 is provided with at least a magnetic film.

4. A hard disk drive comprising:
the magnetic disk according to claim 3.

5. A magnetic disk, wherein
a surface of the substrate for a magnetic disk according to claim 1 is provided with at least a magnetic film.

6. A hard disk drive comprising:
the magnetic disk according to claim 5.

7. A substrate for a magnetic disk having a disk shape, wherein
the substrate has a diameter D of 85 mm or more and 100 mm or less, and a thickness T of 0.3 mm or more and 0.5 mm or less,
regarding a Young's modulus E and the thickness T of the substrate, a value of $E \cdot T^3$ is 3 to 18 (GPa·mm$^3$),
a material of the substrate has a $\rho \cdot (1-\nu)^2 \cdot Q/E$ value of less than 25 (g/cm$^3$/GPa), where $\rho$ represents a density (g/cm$^3$) of the material at room temperature, Q represents a Q-value of the material under conditions of 3000 Hz and room temperature, E represents a Young's modulus (GPa) of the material at room temperature, and $\nu$ represents a Poisson's ratio of the material at room temperature, and
the substrate is a glass substrate made of glass with a glass transition point of 650° C. or higher.

8. The substrate for a magnetic disk according to claim 7, wherein
a chamfered face is formed on at least an outer circumferential end face of the substrate, and
a width $W_1$ of the chamfered face in a radial direction of the substrate is 20 μm or more and 90 μm or less.

9. A magnetic disk, wherein
a surface of the substrate for a magnetic disk according to claim 8 is provided with at least a magnetic film.

10. A hard disk drive comprising:
the magnetic disk according to claim 9.

11. A magnetic disk, wherein
a surface of the substrate for a magnetic disk according to claim 7 is provided with at least a magnetic film.

12. A hard disk drive comprising:
the magnetic disk according to claim 11.

13. A substrate for a magnetic disk having a disk shape, wherein
the substrate has a diameter D of 85 mm or more and 100 mm or less, and a thickness T of 0.3 mm or more and 0.5 mm or less,
regarding a Young's modulus E and the thickness T of the substrate, a value of $E \cdot T^3$ is 3 to 18 (GPa·mm$^3$),
a material of the substrate has a Q-value of 1500 or less under conditions of 3000 Hz and room temperature, and
the substrate is made of a material with an average linear expansion coefficient in a range of 100° C. to 300° C., and the average linear expansion coefficient is $70 \times 10^{-7}$ (1/K) or less.

14. The substrate for a magnetic disk according to claim 13, wherein
a chamfered face is formed on at least an outer circumferential end face of the substrate, and
a width W1 of the chamfered face in a radial direction of the substrate is 20 μm or more and 90 μm or less.

15. A magnetic disk, wherein
a surface of the substrate for a magnetic disk according to claim 14 is provided with at least a magnetic film.

16. A hard disk drive comprising:
the magnetic disk according to claim 15.

17. A magnetic disk, wherein
a surface of the substrate for a magnetic disk according to claim 13 is provided with at least a magnetic film.

18. A hard disk drive comprising:
the magnetic disk according to claim 17.

\* \* \* \* \*